US008883278B2

(12) United States Patent
Cable

(10) Patent No.: US 8,883,278 B2
(45) Date of Patent: Nov. 11, 2014

(54) CONTAINER HAVING BLIND HOLES FOR PINHOLE RESISTANCE AND ASSOCIATED METHOD

(75) Inventor: Kevin Cable, Waynesville, NC (US)

(73) Assignee: Evergreen Packaging, Inc., Memphis, TN (US)

(*) Notice: Subject to any disclaimer, the term of this patent is extended or adjusted under 35 U.S.C. 154(b) by 198 days.

(21) Appl. No.: 13/068,990

(22) Filed: May 25, 2011

(65) Prior Publication Data
US 2012/0298677 A1   Nov. 29, 2012

(51) Int. Cl.
| B32B 1/02 | (2006.01) |
| B65D 1/40 | (2006.01) |
| B65D 3/00 | (2006.01) |
| B65D 5/02 | (2006.01) |
| B65D 5/72 | (2006.01) |
| B65D 6/28 | (2006.01) |
| B65D 17/00 | (2006.01) |
| B65D 5/54 | (2006.01) |
| B65D 5/74 | (2006.01) |
| B29C 65/00 | (2006.01) |
| B31B 1/00 | (2006.01) |
| B29C 65/02 | (2006.01) |
| B29L 31/00 | (2006.01) |

(52) U.S. Cl.
CPC ............... B65D 5/541 (2013.01); B65D 5/746 (2013.01); B29C 66/02242 (2013.01); B29C 66/0246 (2013.01); B29C 66/342 (2013.01); B29C 66/431 (2013.01); B29C 66/43122 (2013.01); B29C 66/72328 (2013.01); B29C 66/851 (2013.01); B31B 1/00 (2013.01); B29C 65/02 (2013.01); B29C 66/73341 (2013.01); B29C 66/71 (2013.01); B29L 2031/7166 (2013.01); B29C 2793/0045 (2013.01); B29C 2793/0054 (2013.01); B31B 2201/25 (2013.01); B31B 2201/6026 (2013.01); B31B 2203/066 (2013.01); B31B 2203/082 (2013.01)

USPC ....... 428/34.2; 428/34.1; 428/35.7; 428/36.6; 229/5.81; 229/5.83; 229/5.84; 229/185.1; 229/213; 229/237; 220/62.11; 220/62.12; 220/62.22; 220/604; 220/626

(58) Field of Classification Search
CPC ............ B65D 1/28; B65D 5/067; B65D 5/40; B65D 5/541; B65D 5/746; B65D 7/06; B32B 1/02; B32B 27/10
USPC .................. 229/232, 213, 214, 237, 244, 249, 229/185.1, 5.81, 5.83, 5.84, 5.85; 220/601, 220/604–606, 626, 62.11, 62.12, 62.13, 220/62.22; 428/34.1, 34.2, 34.4, 34.6, 34.7, 428/35.7–35.9, 36.4, 36.6, 36.7
See application file for complete search history.

(56) References Cited

U.S. PATENT DOCUMENTS

| 4,185,954 A | 1/1980 | Murakami et al. |
| 6,110,548 A | 8/2000 | Kinsey |

(Continued)

FOREIGN PATENT DOCUMENTS

| DE | 10 2004 014 096 | 10/2005 |
| EP | 1226024 | 7/2002 |

(Continued)

OTHER PUBLICATIONS

"Extrusionswerkzeuge für die Schlauchextrusion" by Dipl.-Ing. Georg Burmann, ETA Kunststofftechnologie GmbH, dated Feb. 3, 2006.

(Continued)

Primary Examiner — Walter B Aughenbaugh
(74) Attorney, Agent, or Firm — Bennett Mullinax LLC

(57) ABSTRACT

A container that has a laminate that has a substrate with a gloss layer and a matte layer is provided. A portion of the laminate is located at a seal portion of the container, and a plurality of cavities extend through the gloss layer but do not extend through any amount of the matte layer at the portion of the laminate that is located at the seal portion. The plurality of cavities function to reduce the severity of pinholes at the seal portion.

14 Claims, 8 Drawing Sheets

(56) References Cited

U.S. PATENT DOCUMENTS

| | | | |
|---|---|---|---|
| 6,228,201 | B1 | 5/2001 | Cooper |
| 6,245,395 | B1 | 6/2001 | Falat et al. |
| 6,775,959 | B1 | 8/2004 | Lasson |
| 2005/0053738 | A1 | 3/2005 | Anderson |

FOREIGN PATENT DOCUMENTS

| | | |
|---|---|---|
| EP | 1145971 | 12/2005 |
| JP | 57-189820 | 11/1982 |
| SU | 1682197 | 10/1991 |
| WO | WO 98/14317 | 4/1998 |
| WO | WO 02/30767 | 4/2002 |

OTHER PUBLICATIONS

Search Report of DE 10 2010 023 302.01 dated Jul. 5, 2011 with English translation of relevant portions.

CONTAINER HAVING BLIND HOLES FOR PINHOLE RESISTANCE AND ASSOCIATED METHOD

FIELD OF THE INVENTION

The present invention relates generally to a container that includes a plurality of blind holes that function to reduce the presence of pinholes developed in the container upon construction. More particularly, the present application involves a container that has a plurality of blind holes that extend through the gloss side of the laminate that forms the container and through a portion of the paperboard of the laminate at a sealed section of the container. An associated method of manufacture is also provided.

BACKGROUND

Containers made from laminates, such as those that include paperboard substrates, are known for use in storing beverages such as juice. Containers are designed to prevent oxygen from penetrating the containers to spoil the contents of the container. Further, pinholes present in a matte layer of the laminate may allow negative pressure in the headspace of the container to be released. This release may allow the container to bulge from its initial shape. Consumers may associate bulge of the container with spoilage of the goods inside of the container and with a defective product.

The sealing of containers is accomplished through the heating of the laminate and the application of pressure to the heated portions. Heating causes portions of the matte layer and/or gloss layer to melt. These melted portions are placed into engagement with additional portions of the laminate when the container is folded into a desired shape. The additional portions of laminate may themselves be melted or non-melted. Once cooled, a seal portion is formed such that the laminate may be sealed onto itself at a desired location. Over heating of the laminate may result in "over activation." During such heating, water naturally associated with the substrate may be turned into steam. This steam may escape through the various layers of the matte layer and cause the pinholes to be formed in the matte layer and/or the gloss layer. As used herein, the term pinholes refers to blisters, bubbles, small holes, and other undesirable deformities brought about by the formation of the seal portion of the container through the application of heat to the laminate.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
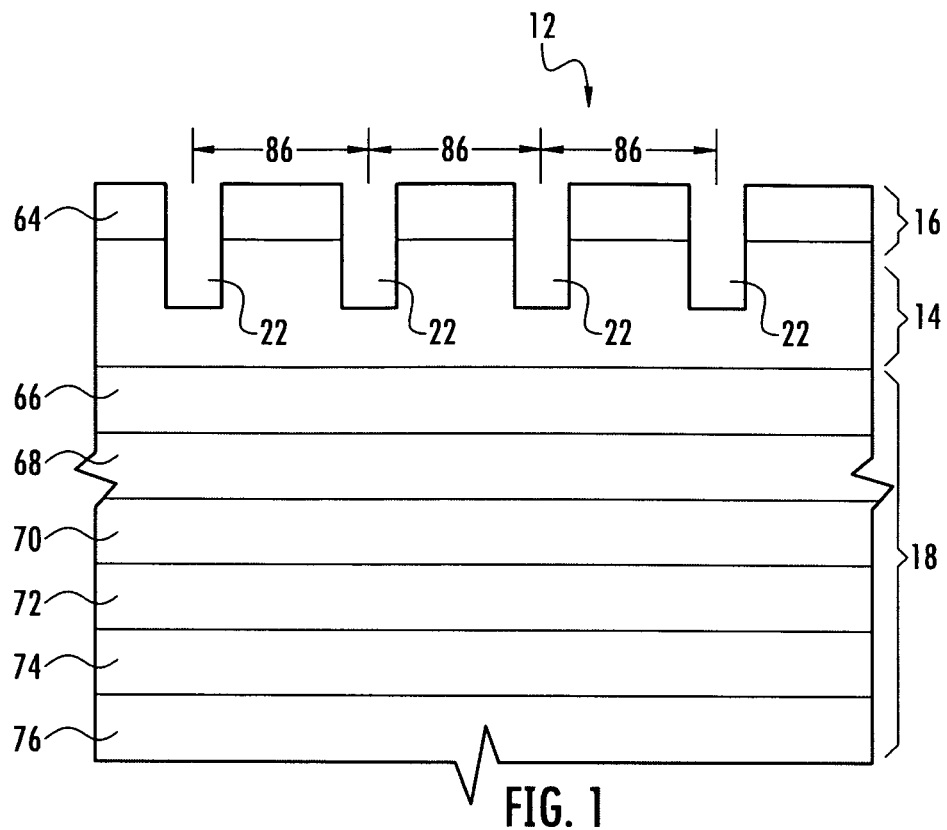
FIG. 1 is a cross-sectional view of a laminate in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a container 10 and associated method of manufacturing a container 10 that includes a laminate 12 with a plurality of blind holes 22 in the laminate 12 located at a seal portion 20 of the container 10. The blind holes 22 function in the creation of the seal portion 20 to vent steam generated by the substrate 14 during the heating of the substrate 14 during sealing. The vented steam is directed away from the substrate 14 and matte layer 18 of the laminate 12 so that the formation of pinholes brought about by the presence of steam in the matte layer 18 is reduced or eliminated. The blind holes 22 may be created mechanically or with the use of a laser. The number, arrangement, depth, angle, and size of the blind holes 22 can be modified as desired to achieve a desired amount of steam venting.

A laminate 12 that can be used in a container 10 in accordance with one exemplary embodiment is illustrated in FIG. 1. The laminate 12 is illustrated in cross-section and only a portion of the laminate 12 is shown. The laminate 12 includes a substrate 14 that may be paperboard in accordance with one exemplary embodiment. A gloss layer 16 is included on one side of the substrate 14. The gloss layer 16 can be a single layer or may be made of multiple layers joined on top of one another. In one arrangement, the gloss layer 16 is a single layer and is a polyolefin polymer layer 64. The polyolefin polymer making up the polyolefin polymer layer 64 may be polyethylene, linear low density polyethylene, or combinations thereof. The gloss layer 16 forms the majority of the outer surface 56 of the container 10 and is thus the portion of the laminate 12 that is exposed to the environment after assembly of the container 10.

A matte layer 18 is included and is located on the substrate 14 on a side of the substrate 14 opposite from the side to which the gloss layer 16 is fixed. The matte layer 18 may be a single layer or can be composed of multiple layers on top of one another. As shown, the matte layer 18 includes a polyamide polymer layer 66 that contacts the substrate 14. The polyamide polymer layer 66 can be NYLON® six, NYLON® sixty-six, or NYLON® ten in accordance with certain embodiments. A first tie layer 68 is adjacent the polyamide polymer layer 66, and a first polyolefin polymer layer 70 is adjacent the first tie layer 68. A second polyolefin polymer layer 72 is adjacent the first polyolefin polymer layer 70. Additionally, a second tie layer 74 is disposed against the second polyolefin polymer layer 72 and a high barrier ethylene vinyl alcohol copolymer layer 76 contacts the second tie layer 74. The adjacent layers 66, 68, 70, 72, 74 and 76 make up the matte layer 18. However, it is to be understood that the matte layer 18 may be made of a larger or smaller number of the layers disclosed in FIG. 1 in accordance with other exemplary embodiments. The matte layer 18 may function to prevent oxygen or contaminates from traversing through the laminate 12 that can contaminate or spoil the substance held in the container 10.

A plurality of blind holes 22 are defined by the laminate 12 and extend through the gloss layer 16 and into the substrate 14 where they terminate. The blind holes 22 do not extend completely through the substrate 14 and do not extend through any portion of the matte layer 18. The blind holes 22 may have a center-to-center distance 86 to adjacent blind holes 22 that is the same through the entire row of blind holes 22. Alternatively, the center-to-center distance 86 may be varied between adjacent blind holes 22 so that adjacent blind holes 22 are not located at the same distance from one another along the entire row of blind holes 22. In certain exemplary embodiments, the center-to-center distance 86 may be 1/16 of an inch.

The blind holes 22 may have a circular cross-sectional shape. Alternatively, the blind holes 22 may be of square, triangular, oval, rectangular, or octagonal cross-sectional shape in other embodiments. All of the blind holes 22 can have the same cross-sectional shape, or different blind holes 22 of the same laminate 12 may have different cross-sectional shapes. Further, although shown as having a consistent cross-sectional shape along the entire depth of the blind holes 22, the size or shape of the blind holes 22 can be varied at one or more points along their depth in other arrangements. The blind holes 22 may be of any size. For example, the blind holes 22 may have a circular cross-sectional shape and may have a diameter of 1/64 of an inch. In other arrangements, the blind holes may be from 0.01 inches to 0.07 inches, from 0.07 inches to 0.1 inches, or up to 0.25 inches in diameter.

The blind holes 22 are illustrated as descending through approximately one half of the thickness of the substrate 14. However, in other exemplary embodiments, the blind holes 22 can be disposed through any amount of the depth of the substrate 14. For example, the blind holes 22 can be disposed through 10%, through 45%, through 75%, from 25%-65%, or up to 95% of the way through the thickness of the substrate 14. Still further, although the blind holes 22 are all shown as extending an equal amount into the substrate 14, it is to be understood that in other arrangements of the container 10 that the blind holes 22 can extend different amounts into the substrate 14 so that some of the blind holes 22 extend one amount into substrate 14 while one or more of the blind holes 22 extend a different amount into substrate 14.

Figure 2:
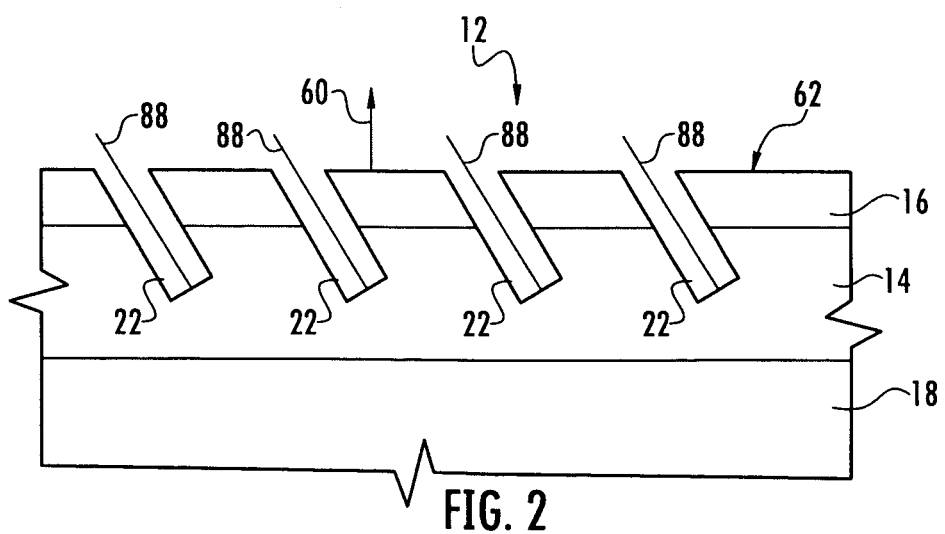
FIG. 2 is a cross-sectional view of a laminate in which the blind holes are oriented at an angle to the upper surface of the gloss layer in accordance with one exemplary embodiment.

The blind holes 22 can extend directly into the laminate 12 so that the blind holes 22 extend from the gloss layer 16 to the substrate 14 in a direction perpendicular to a surface normal 60 of the outer surface 62 of gloss layer 16. FIG. 2 illustrates a different exemplary embodiment in which the blind holes 22 extend at an angle to the surface normal 60. As disclosed, the blind holes 22 may each have an axis 88 that is arranged in the direction of extension of the blind hole 22. The axis 88 may be an axis of the blind hole 22 when the blind hole 22 is circular in shape. Alternatively, the axis 88 may be simply thought of as the direction of extension of the blind hole 22 into the laminate 12 when the blind hole 22 is not a circular blind hole 22. The axis 88 of the blind hole 22 is angled to the surface normal 60 of the outer surface 62 of the gloss layer 16 so that the axis 88 is not parallel to the surface normal 60. The axis 88 can be disposed at any angle. For example, the axis 88 may be at an angle of 5°, 10°, from 15° to 30°, from 30° to 50°, or up to 75° to the surface normal 60. It is to be understood that the aforementioned angles are disclosed so that an angle of 5° is essentially parallel to the surface normal 60, while an angle of 75° degrees is at a significant offset to the surface normal 60 such that the blind hole 22 extends in a direction that is much closer to parallel with the outer surface 62 than with the surface normal 60. The blind holes 22 can all extend at the same angle to the surface normal 60, or different blind holes 22 of the laminate 12 can extend at different angles to the surface normal 60.

Figure 3:
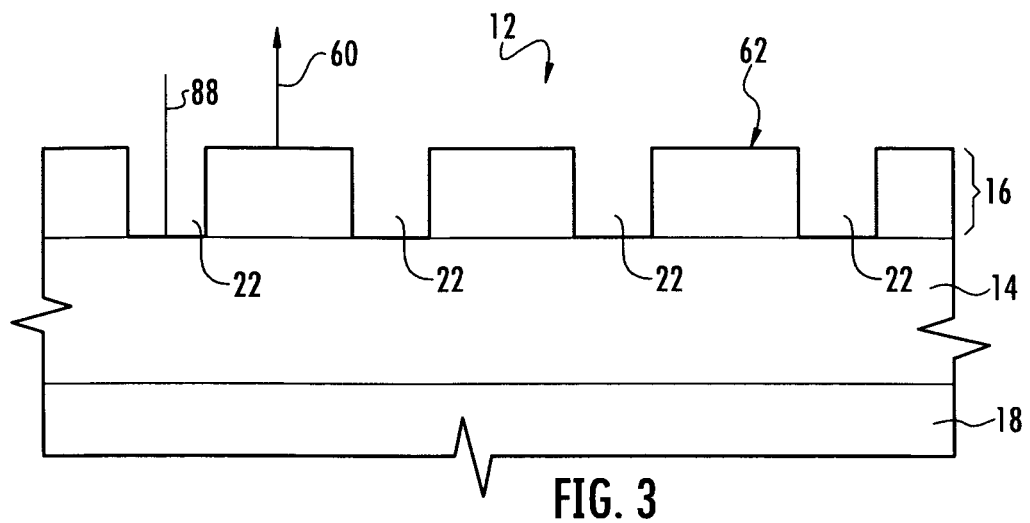
FIG. 3 is a cross-sectional view of a laminate in which the blind holes do not extend into the substrate in accordance with another exemplary embodiment.
Figure 4:
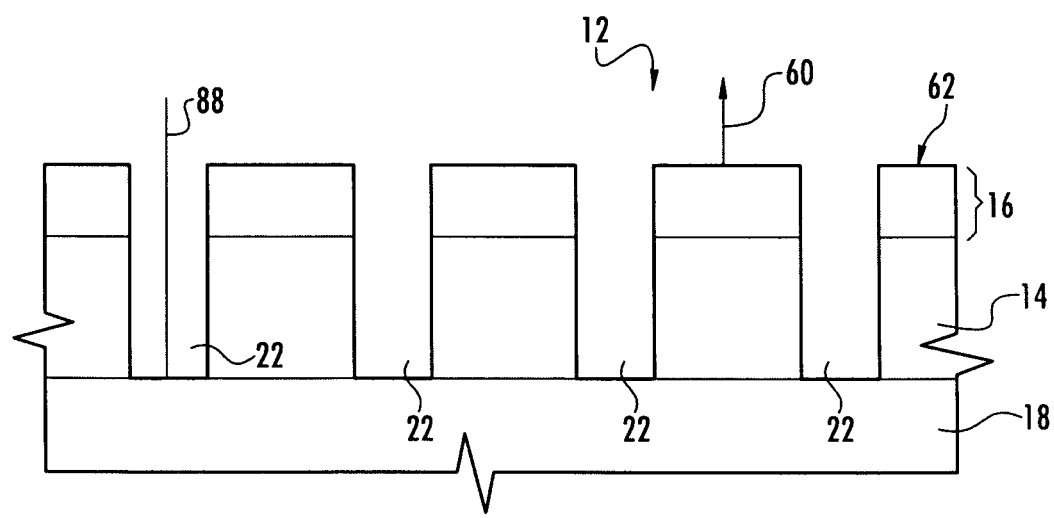
FIG. 4 is a cross-sectional view of a laminate in which the blind holes extend completely through the substrate in accordance with another exemplary embodiment.

FIG. 3 discloses an alternative exemplary embodiment in which the blind holes 22 do not extend through or into the substrate 14. Instead, the blind holes 22 extend completely through the gloss layer 16 but do not extend through any portion of the substrate 14 and in effect terminate at the outer surface of the substrate 14. The blind holes 22 are perpendicular to the surface normal 60. However, the blind holes 22 can be angled to the surface normal 60 as described above in other arrangements. With respect to FIG. 4, an alternative exemplary embodiment of the laminate 12 is disclosed in which the blind holes 22 extend completely through both the gloss layer 16 and the substrate 14. The blind holes 22 do not extend into the matte layer 18 but instead terminate at the inner surface of the substrate 14 so as to terminate at the outer/upper surface of the matte layer 18. The blind holes 22 extend in the direction parallel to the surface normal 60 of the outer surface 62 of the gloss layer 16. The exemplary embodiments disclosed in FIGS. 1-4 have varying numbers of layers in the matte layer 18, blind hole 22 orientation, and blind hole 22 extension depths. The various elements of the disclosed laminates 12 in FIGS. 1-4 can be rearranged with one another in various manners to achieve different laminates 12 with different combinations of the disclosed elements in accordance with various exemplary embodiments.

The laminate 12 can be used to form a container 10 and can be sealed with the application of heat to a seal portion 20 of the container 10. In this regard, heat applied to the laminate 12 may melt material in one or more layers of the laminate 12. For example, heat applied to the laminate 12 may function to melt polyolefin polymer in the matte layer 18 so that subsequent mechanical closing of the container 10 and the application of pressure to the heated portion can be kept until the polyolefin polymer has cooled and solidified thus resulting in the seal portion 20. Any of the described layers of the matte layer 18 and/or gloss layer 16 can be melted in order to create the seal portion 20.

Application of heat to the laminate 12 may cause moisture naturally associated with the substrate 14 to be turned into steam. This steam may escape through the gloss layer 16 by way of the blind holes 22 as they form a path of least resistance. The steam may be less prone to escape through the matte layer 18 thus completely eliminating or reducing the severity of pinholes in the matte layer 18. The matte layer 18 functions as an oxygen barrier and thus pinholes in the matte layer 18 may compromise the oxygen barrier properties of the container 10. Elimination or reduction of pinholes at the laminate 12 that forms a portion of the headspace of the container 10 will prevent rapid and significant container 10 bulge and reduce or eliminate oxygen penetration through pinholes into the interior of the container 10.

The laminate 12 can be arranged so that matte layers 18 engage one another and so that gloss layers 16 are oppositely disposed from one another. However, other arrangements are possible in which a matte layer 18 and a gloss layer 16 are in contact, or in which a pair of gloss layers 16 contact one another. In such situations, the blind holes 22 may still function to reduce the presence of pinholes in the matte layer 18 since in all of these arrangements, steam from the substrate 14 of the laminate 12 is vented or removed through the blind holes 22 and away from the matte layer 18 of each respective portion of the laminate 12. The gloss layer 16 may allow for printing to be placed thereon. Also, the gloss layer 16 can impart some sealing properties and may allow an additional gloss layer 16 to be adhered thereon through melting and pressure application.

The blind holes 22 can be formed with a laser. In certain exemplary embodiments, a 100 Watt laser may be used to create the blind holes 22. In accordance with other exemplary embodiments, the blind holes 22 may be created mechanically. In one exemplary embodiment, a spiked brush wheel can be used to create the blind holes 22. The size, spatial frequency, depth, and angle of the bind holes 22 can be altered for maximum effectiveness without compromising the seal portion 20.

Figure 5:
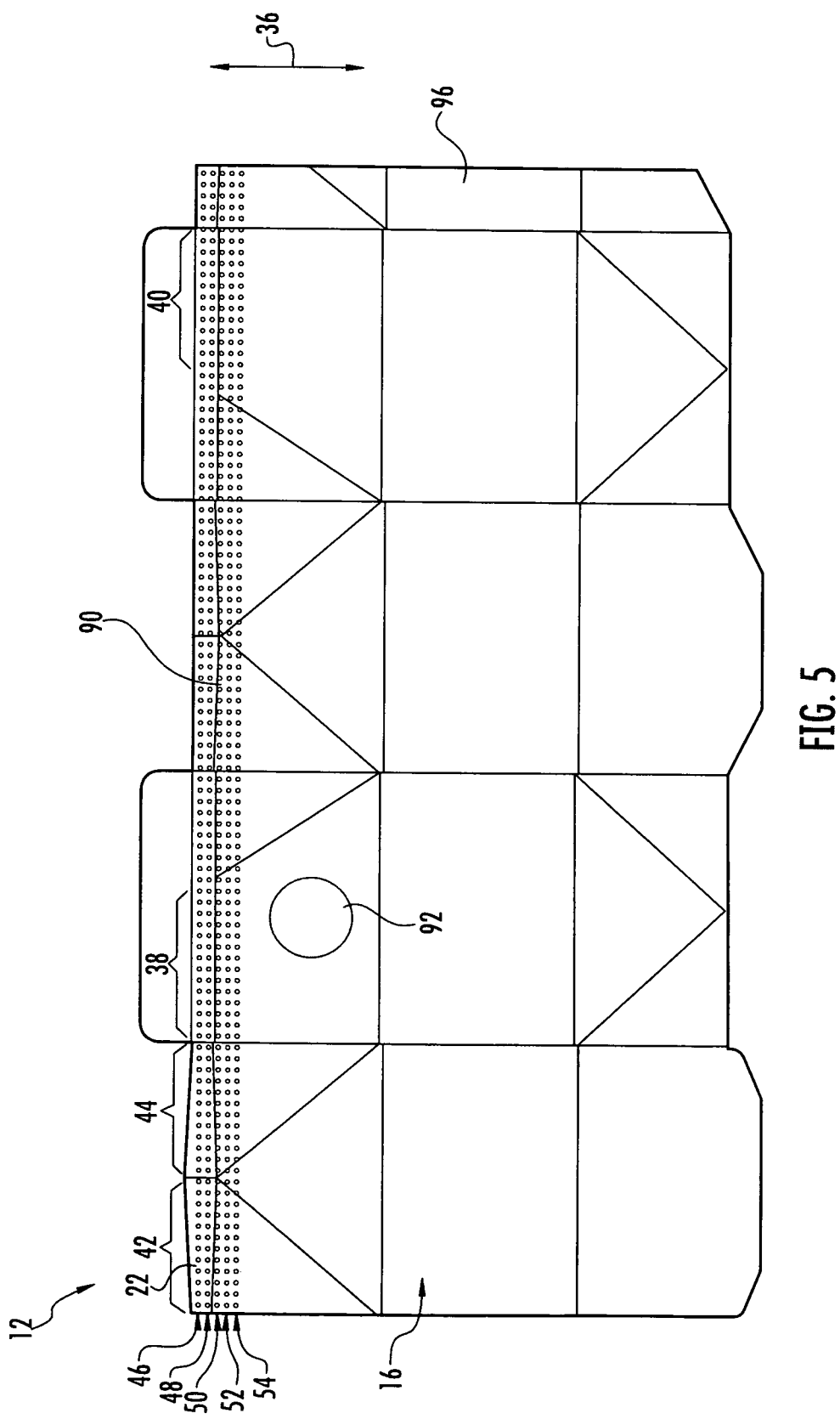
FIG. 5 is a top plan view of a laminate formed into a blank for use in constructing a container in accordance with another exemplary embodiment.
Figure 6:
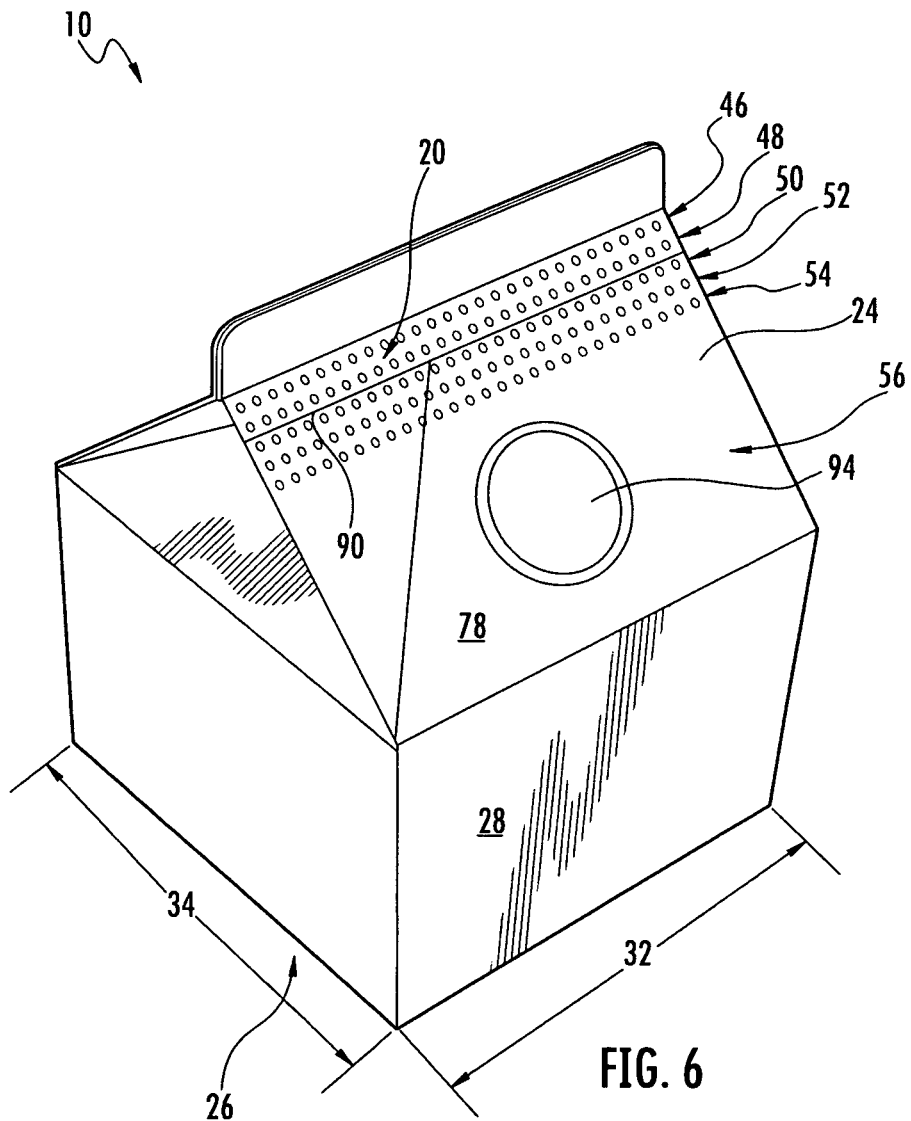
FIG. 6 is a perspective view of a container formed from the laminate blank of FIG. 5.
Figure 7:
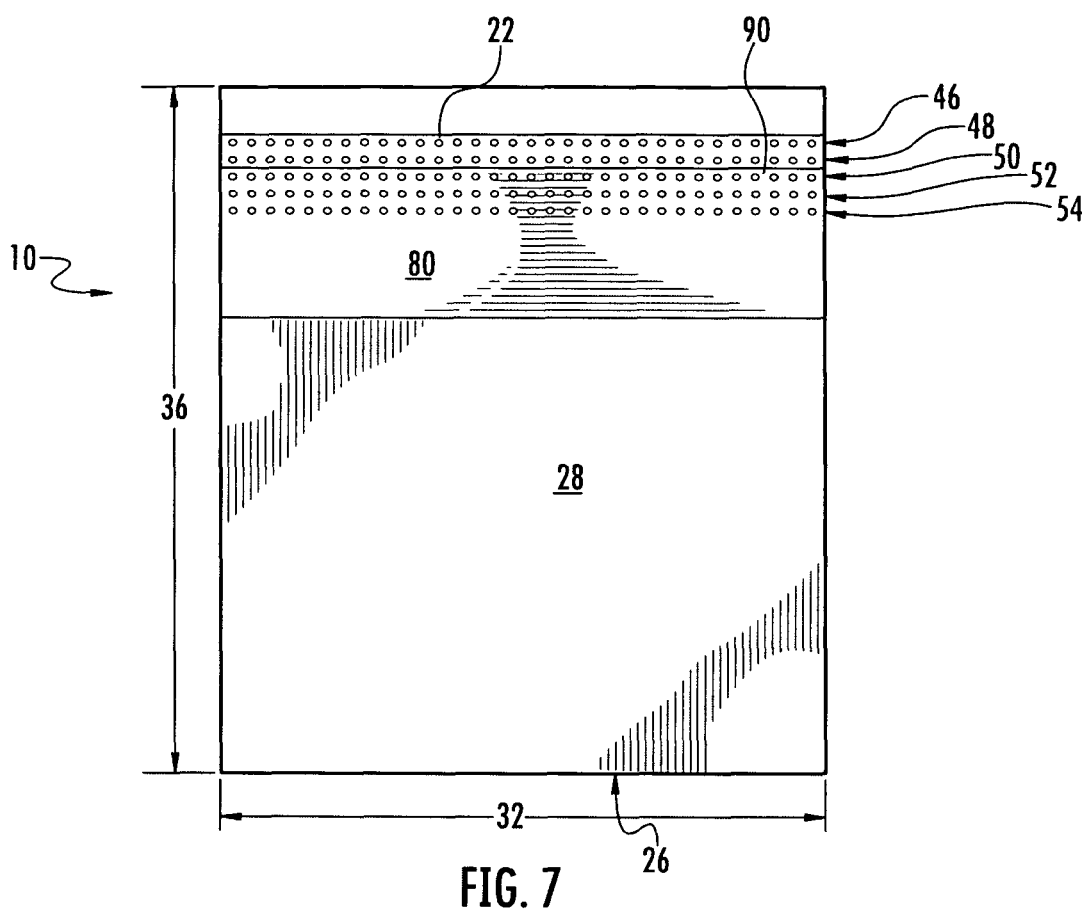
FIG. 7 is a side elevation view of the container formed from the laminate blank of FIG. 5.

The laminate 12 can be used to form a container 10. In this regard, the laminate 12 is provided as a blank and is divided into multiple panels through the provision of score lines. The multiple panels can be folded along the score lines to form portions of the container 10 such as the bottom 26 and the sides 28. FIG. 5 discloses one exemplary embodiment in which the laminate 12 is provided as a blank for the construction of a container 10 in which score lines are placed thereon. The type of container 10 constructed from the blank disclosed in FIG. 5 is known as a gable top container due to the particular shape of the top of the device. FIGS. 6 and 7 show a perspective and side view respectively of the container 10 constructed from the blank revealed in FIG. 5. The gable top 24 of the container 10 can be seen in the assembled shape in FIGS. 6 and 7. The gable top 24 is sealed along its width at a seal portion 20. The seal portion 20 of the container 10 may be the portion of the container 10 that is heated and to which pressure is applied to cause adhering of the laminate 12 to itself or to another object such that an attachment is formed. The seal portion 20 may be the sections of the layers of the laminate, and the sections of the layers above and/or below those sections of the layers, that are melted by heat applied to the laminate in order to form the desired attachment.

The user can tear the gable top 24 at the seal portion 20 in the gable top 24 in order to open the gable top 24 and form a spout for removal of the contents of the container 10. The seal portion 20 can extend along the entire width of the container 10 in the width direction 32. Alternatively, the seal portion 20 may extend along only a portion of the entire width of the container 10 in other embodiments. Additionally or alternatively, a pour cap 94 may be included in the container 10 to allow the substance in the container 10 to be removed. Referring back to FIG. 5, a dispensing aperture 92 can extend completely through the laminate 12. The pour cap 94 can be affixed to the laminate 12 so that the substance in the container 10 can be removed through the dispensing aperture 92 and out of the pour cap 94. The pour cap 94 can be provided with a snap fit, screw type, or single use arrangement for its opening and possible closing. The seal portion 20 that seals the gable top 24 is located above the dispensing aperture 92 in the height direction 36. The blind holes 22 included in the seal portion 20 may all be above the dispensing aperture 92 in the height direction 36 of the container 10.

A score line 90 extends from one end of the laminate 12 to an opposite end. The score line 90 is located at the seal portion 20 of the container 10 once assembled into the gable top 24 arrangement. The plurality of blind holes 22 are also located at the seal portion 20. As disclosed, the blind holes 22 are arranged into a series of rows that extend along the entire width of the laminate 12 from one end to an opposite end as illustrated in FIG. 5. As illustrated, a first row 46 of blind holes 22 is positioned at an upper height of the laminate 12. A second row 48 is located immediately below the first row 46. Third row 50, fourth row 52 and fifth row 54 are located below one another in sequence as disclosed. Each of the rows may have the same amount of blind holes 22 in them, or different amounts of blind holes 22 can be included in the different rows. Although described as extending across the entire width of the laminate 12 from one end to an opposite end, it is to be understood that the rows 46, 48, 50, 52 and 54 need not extend all the way across in other embodiments. Further, it is to be understood as used herein that when described as extending all the way across, the blind holes 22 in the rows need not be located at the opposite edges of the laminate 12 so that the blind holes 22 in fact extend into the edges. Extending all the way across is to be interpreted as meaning that the blind holes 22 on the ends of the rows can be immediately adjacent the opposite edges (for example within a quarter of an inch or an eighth of an inch) without actually engaging the edges of the laminate 12.

Although shown as having five rows 46, 48, 50, 52 and 54, it is to be understood that any number of rows of blind holes 22 can be included in accordance with other exemplary embodiments. For example, there can be 1, 2, 3, from 4-10, or up to 15 rows of blind holes 22 in other arrangements. Further, the rows may be evenly spaced from immediately adjacent rows in the height direction 36 of the container 10 or may be unevenly spaced from adjacent rows in the height direction 36. Also, the blind holes 22 in the rows 46, 48, 50, 52 and 54 can be uniformly spaced along the width of the laminate 12 in FIG. 5 so that a blind hole 22 of one row is immediately above or below a blind hole 22 of an adjacent row or rows. Alternatively, the blind holes 22 in the rows 46, 48, 50, 52 and 54 can be offset such that a blind hole 22 in one of the rows does not have a blind hole 22 immediately above and/or below in an adjacent row. As such, the various rows 46, 48, 50, 52 and 54 can be provided so that they are all uniform with one another or are different. It is to be understood that the blind holes 22 need not be arranged into rows in other exemplary embodiments.

The blind holes 22 are provided so as to be located in the seal portion 20 of the container 10. As shown in FIGS. 6 and 7, the blind holes 22 are located at the seal portion 20 that is the upper seal of the gable top 24 that functions to seal the top of the gable top 24. A user may break the seal portion 20 and form a spout by way of the various score lines and overlaps of the gable top 24. With respect to FIG. 6, the blind holes 22 are on a first outer side 78 of the gable top 24. The blind holes 22 extend across the entire width 32 of the gable top 24 on the first outer side 78. FIG. 7 shows the opposite side of the container 10. The blind holes 22 again extend in the rows 46, 48, 50, 52 and 54 across a second outer side 80 of the gable top 24. The blind holes 22 extend across the entire width 32 of the gable top 24 on the second outer side 80. The score line 90 is located in the gable top 24 and functions to provide certain portions of the shape of the gable top 24. The score line 90 is arranged so that the first and second rows 46 and 48 are above the score line 90 in the height direction 36, and so that the third row 50, fourth row 52, and fifth row 54 are below the score line 90 in the height direction 36.

Figure 8:
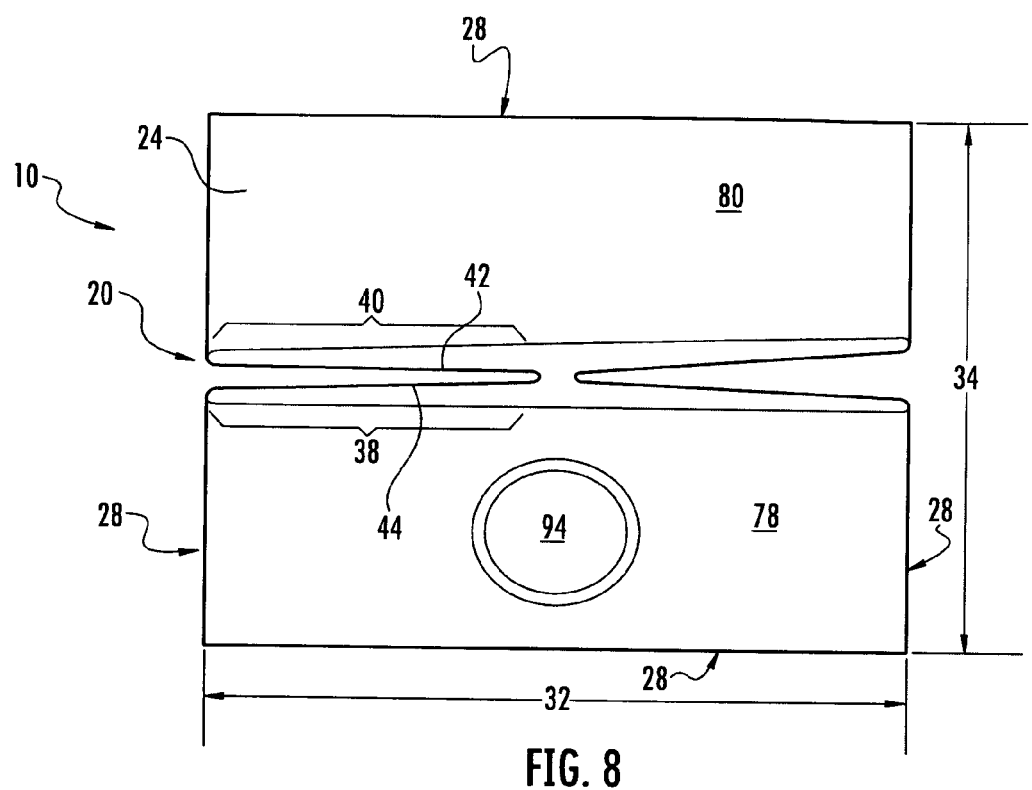
FIG. 8 is a top plan view of a container formed from the laminate blank of FIG. 5 almost completely folded so as to form a seal portion at a gable top of the container.

A first section 38, second section 40, third section 42 and fourth section 44 of the laminate 12 are denoted in FIG. 5. The various sections 38, 40, 42 and 44 include the plurality of blind holes 22 along the denoted width 32 and portions of the gable top 24 and seal portion 20. Upon being assembled into the closed gable top 24, the sections 38, 40, 42 and 44 are folded against one another. Referring now to FIG. 8, a top view of the container 10 as its gable top 24 is about to be assembled is shown. The view in FIG. 8 is made just before the top seal 20 is formed on the gable top 24 to close the gable top 24. As illustrated, the first section 38 is located on the first outer side 78 of the gable top 24, and the second section 40 is located on the second outer side 80. The third section 42 extends from the second section 40, and the fourth section 44 extends from the first section 38. The third section 42 and the fourth section 44 engage one another and are located within the seal portion 20 and do not form a portion of the outer surface 56 of the container 10. All of the sections 38, 40, 42 and 44 have blind holes 22 therein and all of the sections 38, 40, 42 and 44 form part of the seal portion 20. The third and fourth sections 42 and 44 are located between the first and second sections 38 and 40 and form part of the seal portion 20 but are not on the outer surface 56 of the resulting container 20. The sections 38, 40, 42 and 44 are repeating sections because they all contain the same layers. The gloss layers 16 of the third and fourth sections contact one another. The matte layers 18 of the first section 38 and fourth section 44 contact one another. Further, the matte layers 18 of the second section 40 and the third section 42 contact one another.

The seal portion 20 extends across the width 32 of the container 10 and includes more than just the sections 38, 40, 42 and 44 which form but a portion of the overall seal portion 20. The seal portion 20 can be made by closing the gable top 24 shown in FIG. 8 so that the sections 38, 40, 42 and 44 lay flat against one another and so that the other portions that make up the seal portion 20 are pressed into position. The seal portion 20 can then be sealed through the application of pressure thereon. In this regard, these portions of the laminate 12 are heated and then folded into place, and then pressure is applied to form the seal portion 20. In other arrangements, the laminate 12 can be folded into place and then subsequently heat and pressure can be applied to form the seal portion 20.

Figure 9:
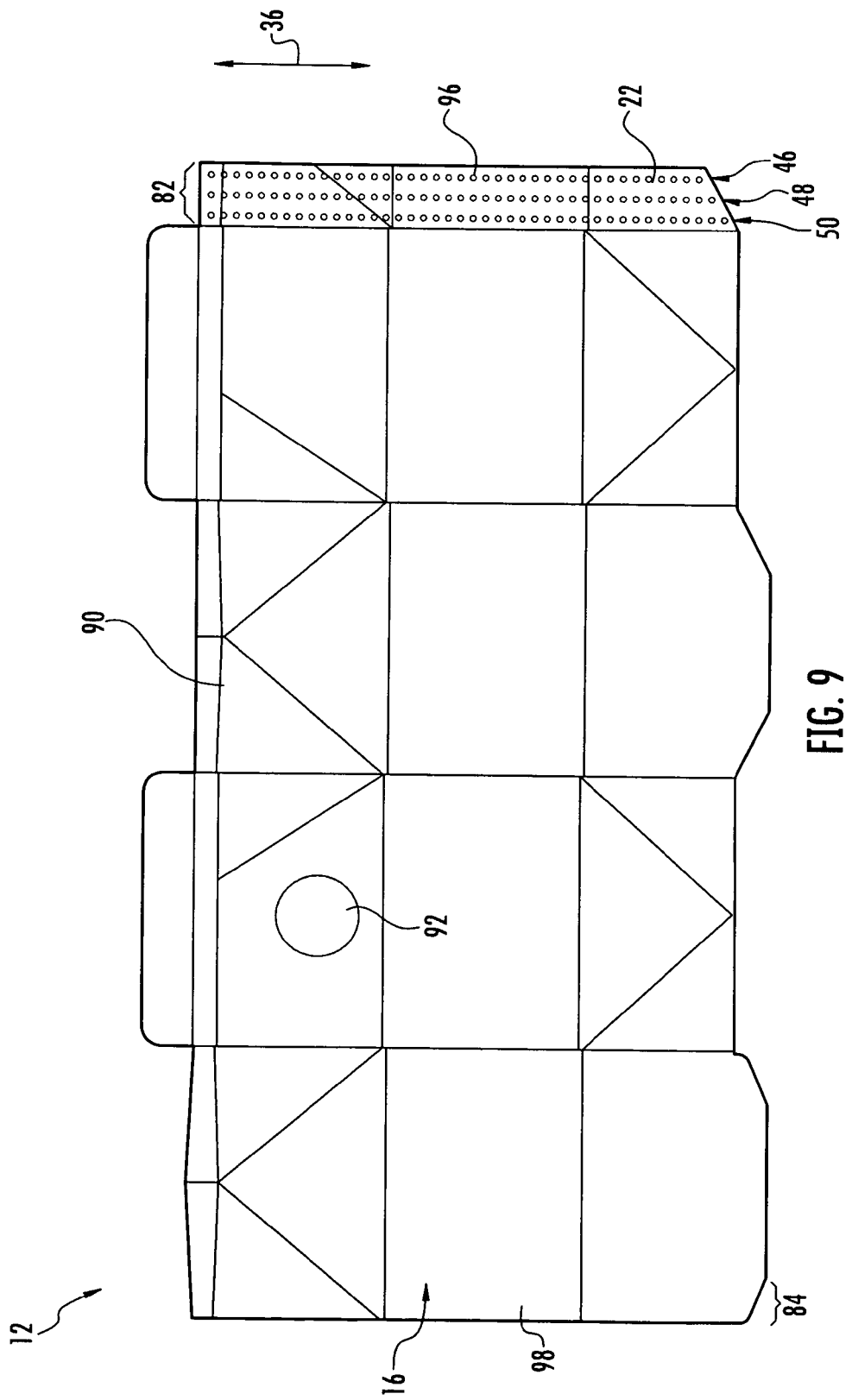
FIG. 9 is a top plan view of a laminate with blind holes on a panel that is used to form a side seal in accordance with another exemplary embodiment.

A laminate 12 used to form another exemplary embodiment of the container 10 is illustrated in FIG. 9. Here, the blind holes 22 do not extend along the width of the laminate 12 proximate to the score line 90 to be eventually used to seal the width 32 of the container 10 at the top of the gable top 24. Instead, the blind holes 22 are located in a panel 96 that is at the side of the laminate 12. The panel 96 is used in forming a seal portion 20 that is a side seal 58 of the container 10. The blind holes 22 extend down into the gloss layer 16 and are arranged in three rows 46, 48 and 50. In other arrangements, a greater or fewer number of rows can be employed in a manner as previously discussed above with respect to the seal portion 20 at the score line 90. Also, the rows 46, 48 and 50 can extend along a portion of the height 36 of the laminate 12 or may extend along the full height 36 of the laminate 12. The rows of blind holes 22 can be numbered, oriented or arranged in manners similar to those associated with the seal portion 20 at the score line 90 as discussed above and a repeat of this information is not necessary.

Figure 10A:
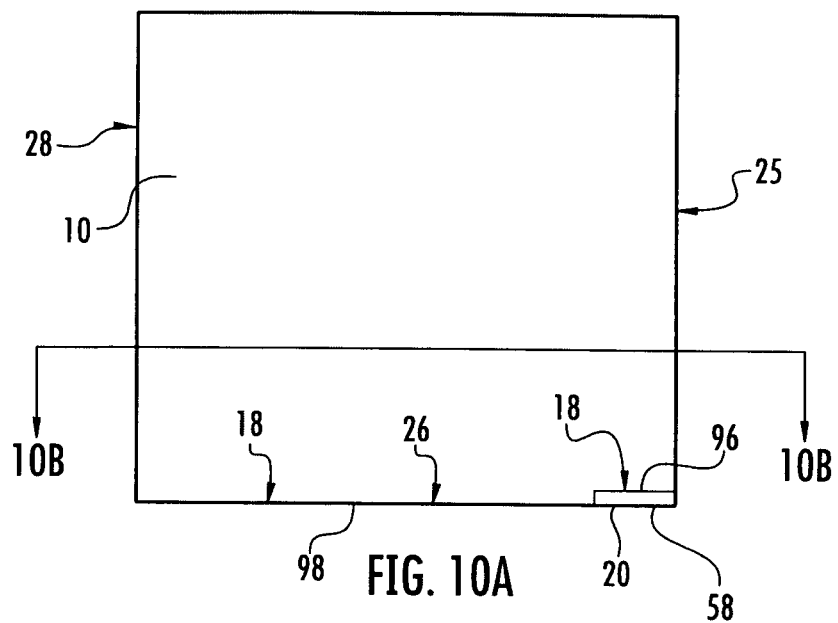
FIG. 10A is a bottom plan view of a partially assembled container formed from the laminate blank of FIG. 9.
Figure 10B:
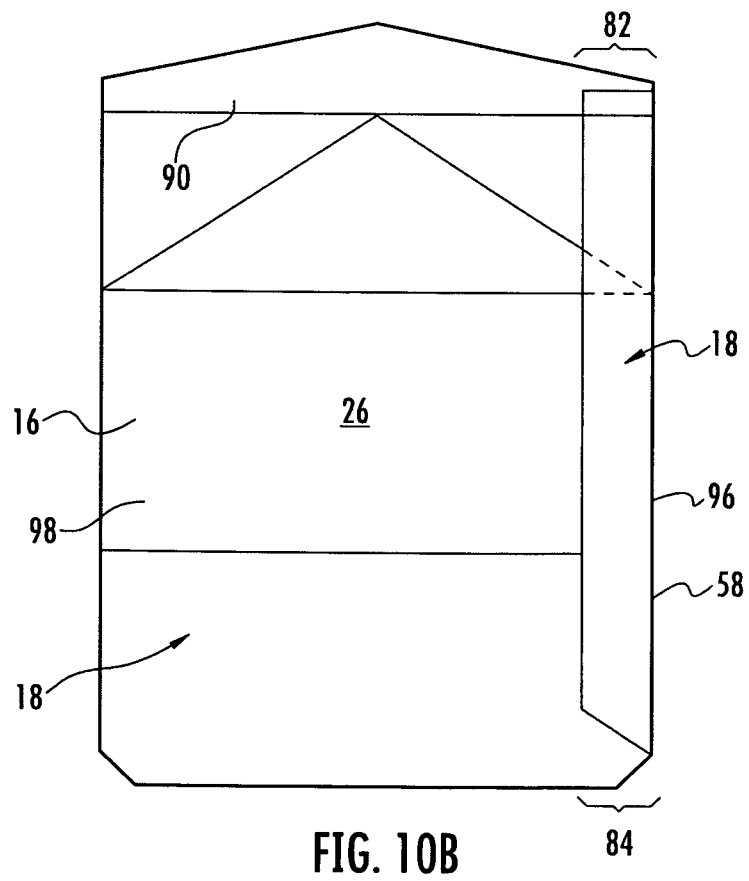
FIG. 10B is a cross-sectional view taken along line 10B-10B of FIG. 10A.

The laminate 12 can be folded at the various score lines into a container 10 as previously discussed. FIGS. 10A and 10B illustrate the laminate 12 of FIG. 9 as folded so that the sides 28 of the container 10 are formed but before the gable top 24 and the bottom 26 of the container 10 are formed. As shown, the panel 96 is attached to panel 98 to form the sides 28 of the container 10. The panel 98 has a matte layer 18 that engages the gloss layer 16 of the panel 96. As viewed in FIG. 10B, the matte layers 18 of both panels 98 and 96 are visible. The seal portion 20 in this instance is the side seal 58. The side seal 58 is formed through a pair of seal sections 82 and 84 in which the first seal section 82 is panel 96, and in which the second seal section 84 is a portion of panel 98. The seal sections 82 and 84 are repeating in that they contain the same layers 14, 16 and 18. Although shown as being formed through two seal sections 82 and 84, it is to be understood that additional seal sections 82 and 84 that may repeat one another with respect to the layers that they contain may be used in other exemplary embodiments. The side seal 58 is formed through the application of heat and pressure to the panels 96 and 98, and the blind holes 22 improve the resulting seal as discussed. In other arrangements, additional blind holes 22 can be provided on the panel 98 through its gloss layer 16 at the side seal 58.

In still further exemplary embodiments, blind holes 22 can be employed on the laminate 12 at both the side seal 58 and at the seal portion 20 at the score line 90 that functions to seal the top of the gable top 24. The seal at the top of the gable top 24 may be referred to as a top seal of the container 10. Although described and illustrated in connection with a side seal 58 and top seal of the container 24, it is to be understood that the seal portion 20 can be located at various parts of the container 24 and thus can be used to seal different areas of the container 24.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A container, comprising:
a laminate that has a substrate that is paperboard with a gloss layer on one side of the paperboard and a matte layer on an opposite side of the paperboard, wherein the laminate forms a gable top, a bottom, and sides of the container, wherein the container is sealed at the gable top, wherein the gloss layer of the laminate forms an outer surface of the container at the seal at the gable top, wherein the outer surface of the container at the seal has a first side on one outer side of the gable top and a second side on a different outer side of the gable top, and wherein a plurality of first cavities extend completely through the gloss layer that forms the outer surface of the container at the seal at the first side and into the paperboard but not completely through the paperboard, and wherein a plurality of second cavities extend completely through the gloss layer that forms the outer surface of the container at the seal at the second side and into the paperboard but not completely through the paperboard.

2. The container as set forth in claim 1, wherein the plurality of cavities have a circular cross-sectional shape.

3. The container as set forth in claim 1, wherein the laminate is folded at the seal so as to form four overlapping sections of the laminate along at least a portion of the seal, wherein the first section includes the outer surface of the container at the seal at the first side on one outer side of the gable top, wherein the second section includes the outer surface of the container at the seal at the second side on the different outer side of the gable top, wherein the plurality of cavities extend completely through the gloss layer of the third section of the laminate and into the paperboard but not completely through the paperboard, and wherein the plurality of cavities extend completely through the gloss layer of the fourth section of the laminate and into the paperboard but not completely through the paperboard.

4. The container as set forth in claim 1, wherein the plurality of cavities at the seal at the first side are arranged into a plurality of rows that extend across the entire width of the gable top such that the cavities in each one of the rows are evenly spaced from subsequent cavities in that particular row, and wherein the rows are offset from one another in a height direction of the container.

5. The container as set forth in claim 1, wherein the container is sealed at the side so as to form a side seal, wherein the laminate is folded at the side seal such that the side seal includes two overlapping sections of the laminate, wherein a plurality of third cavities are associated with the side seal such that a plurality of the third cavities extend completely through the gloss layer of a first section of the laminate at the side seal and into the paperboard of the first section of the laminate at the side seal but not completely through the paperboard of the first section of the laminate at the side seal, and wherein a plurality of the third cavities extend completely through the gloss layer of a second section of the laminate at the side seal and into the paperboard of the second section of the laminate at the side seal but not completely through the paperboard of the second section of the laminate at the side seal.

6. The container as set forth in claim 1, wherein the gloss layer is made of polyolefin polymer, and wherein the matte layer has a polyamide polymer layer, a first tie layer, a first polyolefin polymer layer, a second polyolefin polymer layer, a second tie layer, and an ethylene vinyl alcohol copolymer layer.

7. A container, comprising:
a gable top carton comprising a laminate that has a substrate with a gloss layer on one side of the substrate and a matte layer on an opposite side of the substrate, wherein a portion of the laminate located at a top seal portion of the container defines a plurality of cavities that extend through the gloss layer but do not extend through any amount of the matte layer wherein the plurality of cavities function to reduce a tendency of pinholes to form at the seal portion.

8. The container as set forth in claim 7, wherein the top seal portion extends across the entire width of the container at the gable top, and wherein the laminate is folded at the top seal portion so as to form four overlapping sections of the laminate along at least a section of the top seal portion.

9. The container as set forth in claim 8, wherein at least some of the plurality of cavities are arranged into a first row, a second row, and a third row, wherein the first row, the second row, and the third row extend across the entire width of the container on an outer surface of the container, wherein the cavities in the first row are evenly spaced from subsequent cavities in the first row in the width direction of the container, wherein the cavities in the second row are evenly spaced from subsequent cavities in the second row in the width direction of the container, wherein the cavities in the third row are evenly spaced from subsequent cavities in the third row in the width direction of the container, and wherein the first row is higher than the second row in a height direction of the container, and wherein the second row is higher than the third row in the height direction of the container.

10. The container as set forth in claim 7, wherein the laminate forms a top, a bottom, and sides of the container, and wherein the container comprises a side seal, wherein two edges of the laminate overlaps at the side seal.

11. The container as set forth in claim 7, wherein the plurality of cavities extend completely through the gloss layer and extend partially through the substrate but not completely through the substrate.

12. The container as set forth in claim 11, wherein the plurality of cavities are angled to the gloss layer at the seal portion such that the plurality of cavities to not extend parallel to a surface normal of an outer surface of the gloss layer at the seal portion.

13. The container as set forth in claim 7, wherein the plurality of cavities extend completely through the gloss layer and extend completely through the substrate.

14. The container as set forth in claim 7, wherein the substrate is made of paperboard, wherein the gloss layer is made of polyolefin polymer, and wherein the matte layer has a polyamide polymer layer, a first tie layer, a first polyolefin polymer layer, a second polyolefin polymer layer, a second tie layer, and an ethylene vinyl alcohol copolymer layer.

* * * * *